US012180937B2

(12) United States Patent
Thomsen et al.

(10) Patent No.: US 12,180,937 B2
(45) Date of Patent: Dec. 31, 2024

(54) WIND TURBINE CONTROL FOR DRIVETRAIN LOAD VARIATIONS

(71) Applicant: VESTAS WIND SYSTEMS A/S, Aarhus N. (DK)

(72) Inventors: Jesper Sandberg Thomsen, Hadsten (DK); Johannes Philippus Maree, Aarhus N (DK); Tobias Gybel Hovgaard, Ry (DK); Peter Sloth-Odgaard, Pandrup (DK)

(73) Assignee: VESTAS WIND SYSTEMS A/S, Aarhus (DK)

( * ) Notice: Subject to any disclaimer, the term of this patent is extended or adjusted under 35 U.S.C. 154(b) by 201 days.

(21) Appl. No.: 17/911,983

(22) PCT Filed: Mar. 15, 2021

(86) PCT No.: PCT/DK2021/050082
§ 371 (c)(1),
(2) Date: Sep. 15, 2022

(87) PCT Pub. No.: WO2021/185422
PCT Pub. Date: Sep. 23, 2021

(65) Prior Publication Data
US 2023/0184216 A1    Jun. 15, 2023

(30) Foreign Application Priority Data
Mar. 16, 2020  (DK) .......................... PA 2020 70171

(51) Int. Cl.
*H02P 9/02*     (2006.01)
*F03D 7/02*     (2006.01)
(52) U.S. Cl.
CPC ............. *F03D 7/028* (2013.01); *H02P 9/02* (2013.01); *F05B 2270/1033* (2013.01); *F05B 2270/327* (2013.01)

(58) Field of Classification Search
None
See application file for complete search history.

(56) References Cited

U.S. PATENT DOCUMENTS

2023/0184216 A1*   6/2023   Thomsen ............... F03D 7/028
                                                              290/44

FOREIGN PATENT DOCUMENTS

| CN | 105790270 A | 7/2016 |
|---|---|---|
| CN | 106368900 B | 2/2019 |

(Continued)

OTHER PUBLICATIONS

Danish Patent and Trademark Office, 1st Technical Examination of Application including the Search Report and Search Opinion for PA 2020 70171 dated Aug. 31, 2020.

(Continued)

*Primary Examiner* — Tulsidas C Patel
*Assistant Examiner* — S. Mikailoff
(74) *Attorney, Agent, or Firm* — Patterson + Sheridan, LLP

(57) ABSTRACT

The invention relates to control of a wind turbine to address varying drivetrain loading. This is obtained by determining a modification signal to be set as a control signal. A signal indicative of a speed of the electrical generator a signal indicative of a requested output power are received. The signal indicative of a speed is filtering to isolate frequencies in a selected disturbance frequency band to generate a disturbance signal. The disturbance signal is phase shifted and combined with a requested output power to obtain the modification signal.

14 Claims, 5 Drawing Sheets

(56) References Cited

FOREIGN PATENT DOCUMENTS

| EP | 2487784 A1 | 8/2012 |
| EP | 3613981 A1 | 2/2020 |
| WO | 2008145128 A2 | 12/2008 |
| WO | 2021185422 A1 | 9/2021 |

OTHER PUBLICATIONS

PCT, International Search Report for Application PCT/DK2021/050082 dated Jun. 17, 2021.
Anca D. Hansen et al., " Modelling and control of variable-speed multi-pole permanent magnet synchronous generator wind turbine," Wind Energy, vol. 11, No. 5, Dated Sep. 1, 2008, pp. 537-554.
PCT, Written Opinion of The International Searching Authority for Application PCT/DK2021/050082 dated Jun. 17, 2021.

\* cited by examiner

WIND TURBINE CONTROL FOR DRIVETRAIN LOAD VARIATIONS

TECHNICAL FIELD

The invention relates to control of a wind turbine, and in particular the invention relates to control of a wind turbine to address varying drivetrain loading.

BACKGROUND TO THE INVENTION

A conventional horizontal-axis wind turbine generator (WTG) typically has a rotor comprising three blades that are equi-angularly spaced around a central hub. When driven by the wind, the blades rotate around a horizontal axis coinciding with the central hub to extract energy, and in doing so cover a large, disc-like 'swept area'.

Wind conditions are normally not uniform throughout the swept area of a rotor, meaning that each blade experiences varying loads as it completes a full rotation. It follows that, for given wind conditions, there will be a certain orientation of the rotor at which it is subjected to a maximum load, and a corresponding orientation in which the load on the rotor is minimal. For rotors having three blades, the rotor will transition between the positions of maximum and minimum load three times for each full rotation of the blade, causing a cyclical loading on the rotor having a frequency three times that of the rotor frequency. This is referred to as a '3P disturbance' or '3P loading', where the rotor frequency is '1P'. It will be appreciated that this value scales accordingly for rotors having a different number of blades so that, for example, a rotor having two blades experiences 2P loading. Moreover, specific wind conditions may promote other cyclical loadings.

Such cyclical disturbance will also be reflected in cyclical loading in a drivetrain of the WTG, which can promote fatigue and so reduce the operational lifetime of the components of the drivetrain.

It is against this background that the invention has been devised.

SUMMARY OF THE INVENTION

Disturbances on the rotor propagates to the drive train to incur drive train load variations, which again will lead to fatigue exposure on the drive train. It is an object of the present invention to provide a solution which reduces the fatigue exposure of the drive train due to load variations on the rotor.

An aspect of the invention provides a method of controlling a wind turbine, the wind turbine comprising a rotor having one or more blades and an electrical generator, the rotor being connected to the electrical generator by a drivetrain, the method comprising:
  receiving a signal indicative of a speed of the electrical generator (11) and receiving a signal indicative of a requested output power;
  filtering the signal indicative of the speed to isolate frequencies in a selected disturbance frequency band to generate a disturbance signal;
  phase shifting the disturbance signal phase to match a phase of torque variations of the rotor at the frequencies of the selected disturbance frequency band to generate a phase shifted signal;
  generate a modification signal being a combination of the phase shifted signal and the requested output power;
  setting the modification signal as a control signal for the wind turbine.

In a wind turbine, the wind drives the rotor and thereby generates a rotor torque which is transferred to the generator via the drive train. The generator is electro-magnetically coupled to the to drive train to extract the rotational energy, and this coupling generates a generator-induced counter torque on the drive train. The invention modifies the torque produced by the electrical generator at the frequencies of the selected disturbance frequency band thereby reducing torque variations between the torque disturbances of the rotor and the generator-induced counter-torque. Torque variations between the rotor side and the generator side of the drive train will lead to fatigue exposure, and by reducing the torque variations, the fatigue exposure is also reduced.

The steps of the method lead to a modification signal which is combined with a signal indicative of the requested output power so that the control signal will include a component that oscillates in phase with the torque disturbance on the rotor. In this manner the control signal will include a component that follows the torque disturbance. Disturbances in the torque on the rotor will thereby (at least partly) be transmitted through the drivetrain and into the electrical system of the generator and converter and risk disturbing the generated electric power. The torque disturbances may be injected into the grid or dealt with by the turbine's power system, e.g. by a storage system arranged to absorb the disturbances. The present invention thereby reduces the fatigue exposure on the drive train, at the expense of increased output power disturbances. The approach does not dampen drivetrain resonant oscillations, rather it is an alternative way of handling drivetrain oscillations. Embodiments of the present invention may be combined with or implemented as an alternative to traditional drivetrain damping routines.

In further aspects, the invention relates to a wind turbine control system arranged to perform the method according to the first aspect and to a computer program product comprising software code adapted to control a wind turbine when executed on a data processing system, the computer program product being adapted to perform the method of the first aspect.

The computer program product may be provided on a computer readable storage medium or being downloadable from a communication network. The computer program product comprises instructions to cause a data processing system, e.g. in the form of a controller, to carry out the instruction when loaded onto the data processing system.

In general, a controller may be a unit or collection of functional units which comprises one or more processors, input/output interface(s) and a memory capable of storing instructions can be executed by a processor.

In general, the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

So that it may be more fully understood, the invention will now be described, by way of example only, with reference to the following drawings, in which like features are assigned like reference numerals, and in which.

DESCRIPTION OF EMBODIMENTS OF THE INVENTION

Figure 1:
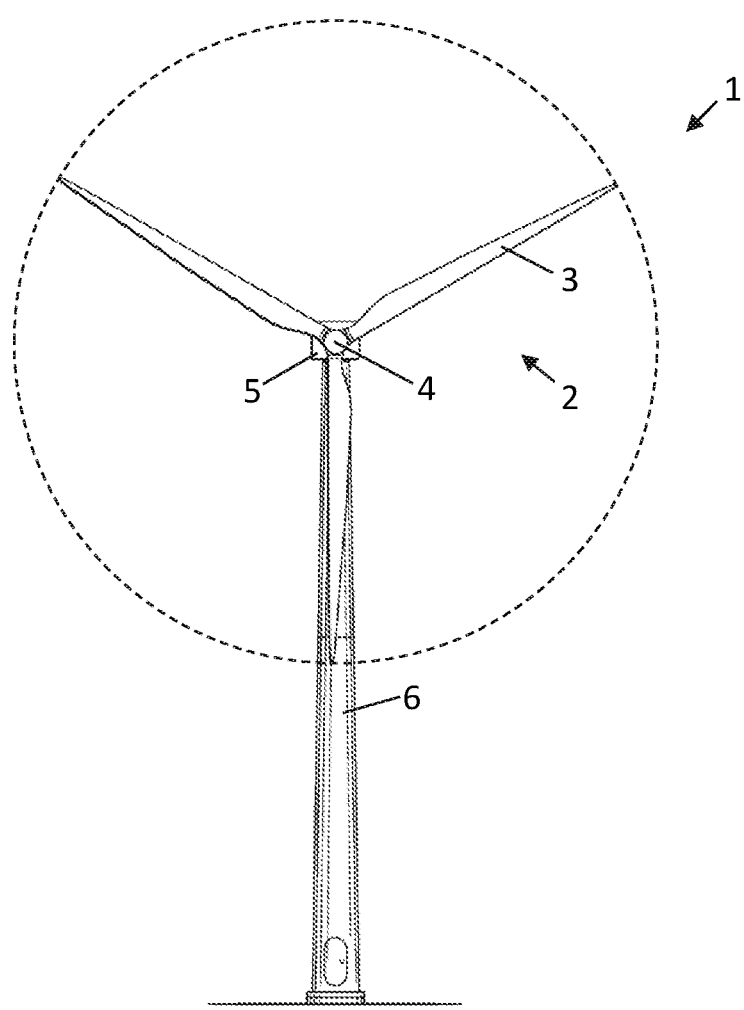
FIG. 1 is a schematic diagram of a wind turbine.

Before describing the implementation of this technique in more detail, to provide context for the invention an individual WTG 1 of a kind that may be controlled according to embodiments of the invention is first described with reference to FIG. 1. It should be appreciated that the WTG 1 of FIG. 1 is referred to here by way of example only, and it would be possible to implement embodiments of the invention into many different types of wind turbine systems and power plant architectures.

The WTG 1 shown is a three-bladed upwind horizontal-axis wind turbine (HAWT), which is the most common type of turbine in use. The WTG 1 comprises a rotor 2 having three blades 3 extending radially from, and equi-angularly spaced around, a central hub 4, the rotor 2 being supported by its hub 4 at the front of a nacelle 5. It is noted that although three blades are common, different numbers of blades may be used in alternative implementations. The nacelle 5 is in turn mounted at the top of a tower 6, which is secured to a foundation (not shown) that is embedded in the ground.

The nacelle 5 contains a generator (not shown in FIG. 1) that is driven by the rotor 2 to produce electrical energy. Thus, the WTG 1 is able to generate electrical power from a flow of wind passing through the swept area of the rotor 2 causing rotation of the blades 3.

In this respect, the blades 3 cover a circular swept area that is represented in FIG. 1 by a dashed circle encompassing the tips of the blades 3. The swept area of a conventional grid-connected WTG typically has a diameter of more than 80 metres, and so wind conditions are not uniform throughout the swept area. As noted above, the spatial variation of the wind field within the swept area leads to peaks and troughs in wind-induced loads on the rotor 2 as it turns, thereby risk producing disturbances on the rotor.

Figure 2:
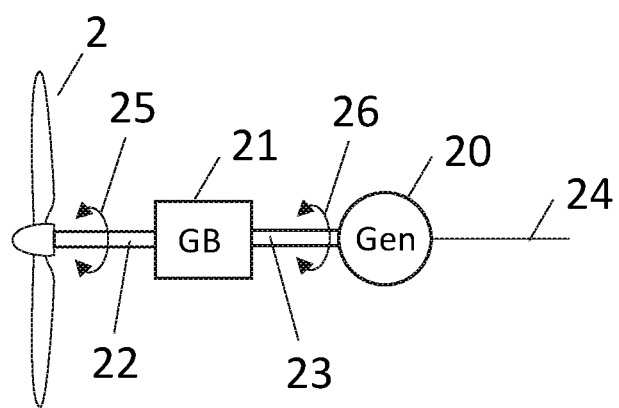
FIG. 2 is a schematic diagram a rotor connected to an electrical generator by a drivetrain.

FIG. 2 schematically illustrates the rotor 2 and an electrical generator 20, where the rotor is connected to the electrical generator by a drivetrain 21, 22 and 23. The drivetrain is schematically illustrated by a low speed shaft 22 mechanically coupled to the rotor, a gearbox 21 and a high speed shaft 23 electro-magnetically coupled to the generator 20. The generator output is connected to the grid, schematically illustrated by line 24, typically via a converter, a transformer and further electrical equipment (not shown). While a gearbox is shown, it is noted that many turbines operate without a gearbox, and that embodiments of the present invention also cover turbines without a gearbox.

As mentioned above, torque disturbance at the rotor 25 couple via the drivetrain to the generator and will generate disturbance at the generator torque 26. By modifying the generator torque 26 by a control command to the generator where the modification is in phase with the rotor torque disturbances, the drivetrain fatigue exposure is reduced.

Figure 3:
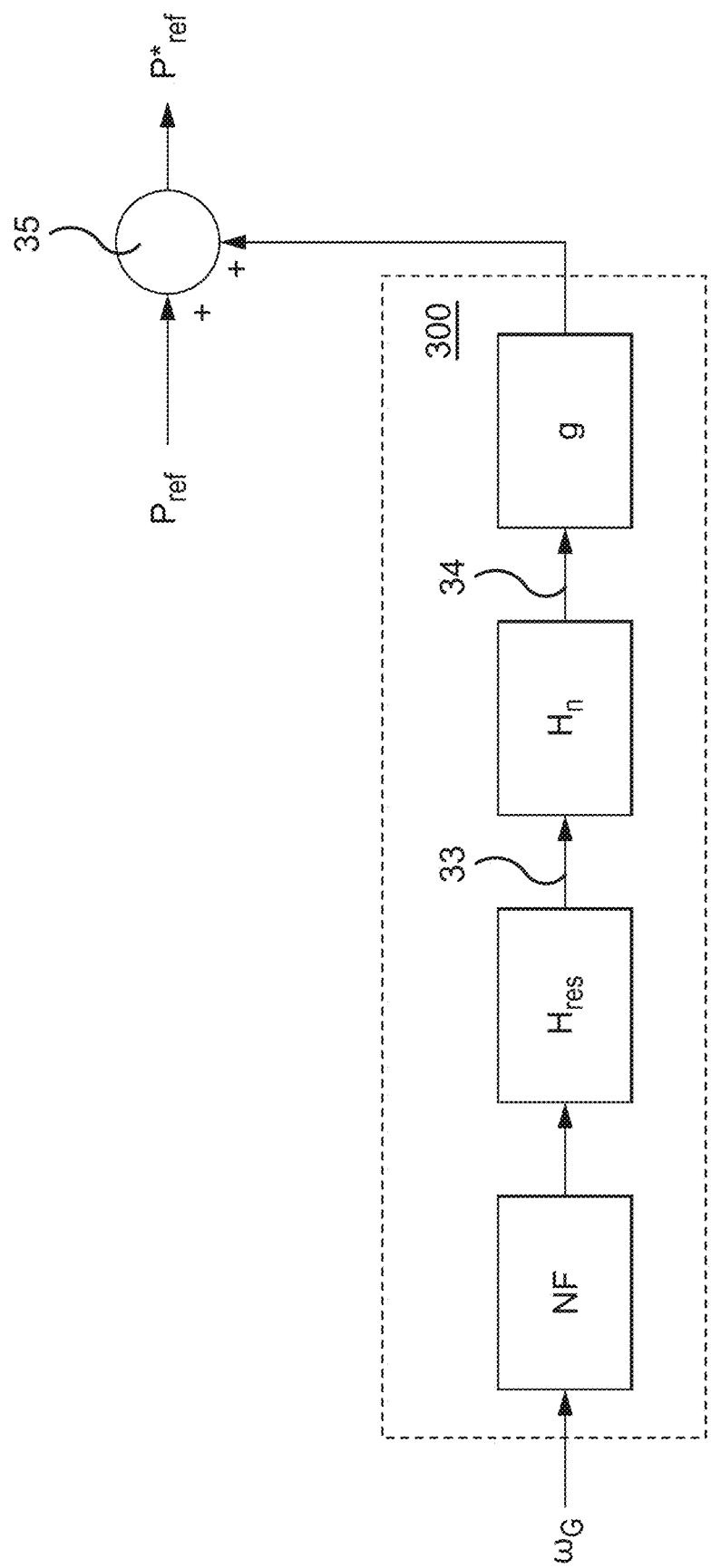
FIG. 3 is a schematic diagram of functional computing elements of an embodiment of the present invention.

FIG. 3 illustrates general elements in accordance with embodiments of the present invention which achieve to increase the torsional stiffness of the drivetrain by operating the generator in a manner which relaxes the generator torque at the frequency band of the disturbance of the rotor torque disturbance.

A signal indicative of a speed of the electrical generator, $\omega_R$, and a signal indicative of a requested output power, $P_{ref}$, are received. The signal indicative of the speed of the electrical generator is in an embodiment a rotational speed measurement of the generator, either by a detector at the high-speed shaft, or by a detector in the generator.

As an optional pre-processing signal filter prior to applying the resonance filter ($H_{res}$), a drive train notch filter NF may be applied to remove resonant frequency (ies) of the drive train. This removes the drive train frequency content and thereby removes frequency content which is not related to the rotor disturbance.

The pre-processed signal is filtered by a resonance filter ($H_{res}$). The resonance filter is implemented to isolate frequencies in a selected disturbance frequency band to generate a disturbance signal 33.

The disturbance signal 33 is further filtered by one or more filters $H_n$ which phase shift the signal. The disturbance signal being phase shifting so that the resulting signal phase match a phase of torque variations of the rotor at the frequencies of the selected disturbance frequency band to generate a phase shifted signal 34.

The phase shifted signal 34 is optionally modified with a controller gain, g, and combined with the requested output power $P_{ref}$ to generate a modification signal, $P^*_{ref}$ being a combination of the phase shifted signal and the requested output power. This may be an addition, or superposition, of the two input signals to the combiner 35.

The modification signal is set as a control signal for the wind turbine. In an embodiment, the modification signal is forwarded as the power reference for the converter controller.

Further embodiments, with reference to FIG. 3 will now be discussed.

The present invention takes as input a signal indicative of a speed of the electrical generator. In the embodiment of FIG. 3 this is the generator speed $\omega_G$, in general this signal may further be based on the rotor speed signal or a combination of the rotor speed signal and the generator speed signal. Moreover, in an even further embodiment, the signal indicative of a speed of the electrical generator may be based on a rotational load signal of the rotor axis.

FIG. 3 illustrate a signal processing module 300 implemented in accordance with embodiments of the present invention.

FIG. 3 illustrates that the requested output power may be the requested power reference. In general the signal indicative of the requested output power may be either the requested output power or the requested generator torque, e.g. in the form of a power reference or a torque reference, where a torque reference relates to a target generator torque. The signal indicative of the requested output power is modified, and the modified signal is set as a control signal for the wind turbine. The control signal will typically be a modified version of the signal indicative of the requested output signal, thus in embodiments the control signal comprises a power reference or a torque reference for controlling the output power of the wind turbine.

As mentioned, an optional notch filter NF may be applied prior to filtering the signal to isolate frequencies in a selected disturbance frequency band. The input signal is filtered with a drive train notch filter, which removes a resonant frequency of the drive train. A drivetrain notch filter is a band-stop filter having a narrow stopband that is centred around the drivetrain frequency to remove that band of frequencies from the signal, since the drivetrain is a significant source of noise in the measurements. By removing the drivetrain resonances, the modification signal can more clearly be targeted to the signal content of the disturbance.

The notch filter NF may also be configured to remove other frequencies corresponding to further known sources of noise.

A resonance filter ($H_{res}$) may be utilized to isolate frequencies in a selected disturbance frequency band to generate the disturbance signal. Such filter is also often termed a bandpass filter and may be implemented in any suitable way.

In general embodiments the selected disturbance frequency band is selected to match a frequency band of torque variations of the rotor movement. In a general approach, the frequency characteristics of the torque variations may be determined. However, the resonance filter may specifically be implemented to isolate frequencies in a disturbance frequency band with a frequency band around a rotor frequency order. That is to isolate signal content at an nP frequency, n being an integer. In an embodiment the resonance filter may be implemented as a bandpass filter centred at the selected rotor frequency order with a bandwidth of a few percent, such as between 5% and 10%, many suitable bandpass filters provide such bandwidth directly. In an important embodiment, the target rotor frequency order is 3, such that the resonance filter is implemented to isolate signal content in a band centred at the 3P frequency. A three bladed turbine will experience 3P loading in use as a result of the interaction between the blades and the spatially varying wind field within the swept area of the rotor 2.

The disturbance signal 33 obtained after application of the resonance filter ($H_{res}$) will be in phase with the generator speed. This signal is phase shifted to match a phase of the torque variations of the rotor at the frequencies of the selected disturbance frequency band. The phase of the torque variations will that of the position of the rotor. In an embodiment, the phase is shifted such that the disturbance signal becomes perpendicular to the torque variations. For a signal being the generator speed, the phase shift should be around −90° relative to the 3P loading. A phase shift of −90° can be obtained by one or more low pass filter, depending on the specific implementation of the low pass filter. Alternative phase shift filters may be used if desired.

In the illustrated embodiment of FIG. 3 the phase shifted signal is based on the generator speed to be combined with a power reference. There may therefore be a need for adjusting the amplitude of the signal, that is to further modify the phase shifted signal with a signal gain g.

The signal gain may in embodiments be a fixed gain or a gain set in dependency of an input or a state of the turbine. In an embodiment the signal gain comprises a term being based on the wind speed or on the operational point of the wind turbine. In particular, if the control signal is a power reference, and since the disturbance is related to torque, for low rotor speeds, a smaller gain may be beneficial, as power is equal to the torque multiplied with the generator speed.

As mentioned earlier, as the reduction of the drivetrain oscillation may migrate to the grid in the form of an increased grid power disturbance. In situation where the level of grid power disturbances cannot be tolerated, the signal gain g can be used to reduce the modification of the power reference. By determining an electrical disturbance at a point of measurement electrically connecting the wind turbine to an electrical grid, e.g. at the point of common coupling, the signal gain may be based on the determined electrical disturbance. That is for a high electrical disturbance the gain is set low.

In embodiments, there may be set a limit on the size of the modification signal. Such a limit may be implemented by a saturation filter. A saturation filter cuts off the signal above a certain threshold. Simple cut-off may incur undesired cut-off effects in the signal, and in an embodiment, the phase shifted signal is dynamic range scheduled instead of applying a saturation filter. In dynamic range scheduling the amplitude of the signal is scaled so that the peak values substantially match the cut-off level.

Modern wind turbines are operated by a number of computerized controllers which based on input signals determines actuator output signals. Many turbines controllers are implemented as feedback controllers of the proportional-integral-derivative (PID) type. PID-type controllers are well-known and reliable controllers. Wind turbines are quite complex machines operating in complex, varying and often unpredictable environment. There may therefore be an advantage in applying more advanced control techniques of the multiple input, multiple output (MIMO) type. One example of such advanced controller is a controller based on the so-called Model Predictive Control (MPC) methodology.

Model Predictive Control (MPC) is a multivariable control algorithm that uses an optimization cost function J over the receding prediction horizon, to calculate the optimal control settings.

In an embodiment the signal indicative of the requested output power may be determined using a model predictive control (MPC) routine.

An MPC controller repeatedly calculates a predicted operational trajectory, also sometimes referred to as a prediction horizon. An MPC routine is a receding horizon control routine which optimizes the current timeslot, k, while taking future timeslots in account by optimizing a finite time-horizon, using the current timeslot as the control value and then optimize again, repeatedly. The operational trajectory comprises a time series of at least one variable, here a value of the signal indicative of the requested output power.

In an embodiment a predicted operational trajectory of a predicted signal indicative of the requested output power is calculated using a model predictive control (MPC) routine, where a trajectory comprises a time series values indicative of the requested output power, and where the trajectory includes a predicted first control value. In this embodiment, the signal indicative of a requested output power ($P_{ref}$) is set based on the predicted first control value.

Figure 4:
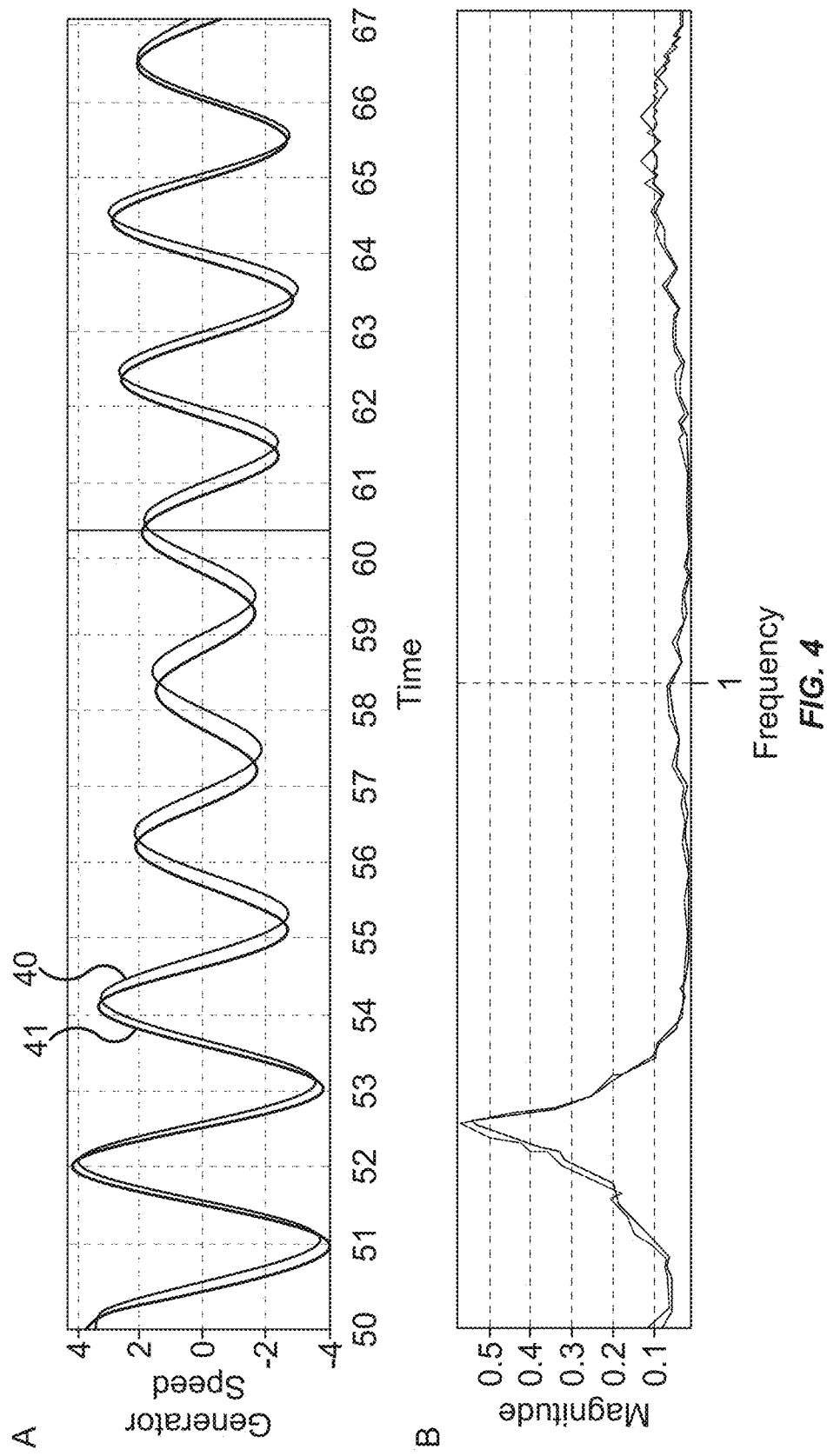
FIGS. 4 to 6 show plots of simulated signals obtained with and without the use of a signal processing module in accordance with an embodiment of the present invention.
Figure 5:
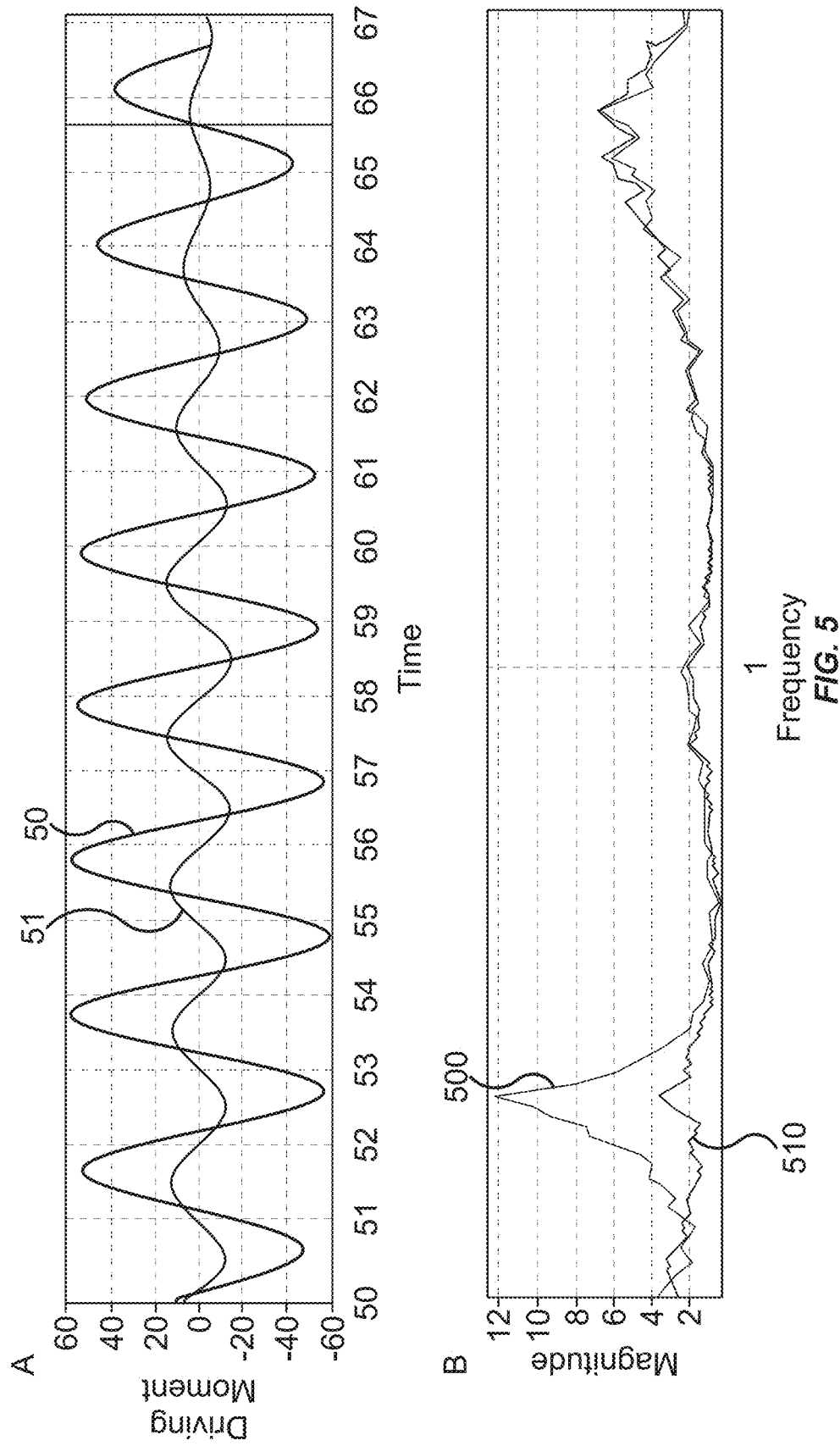
Figure 6:
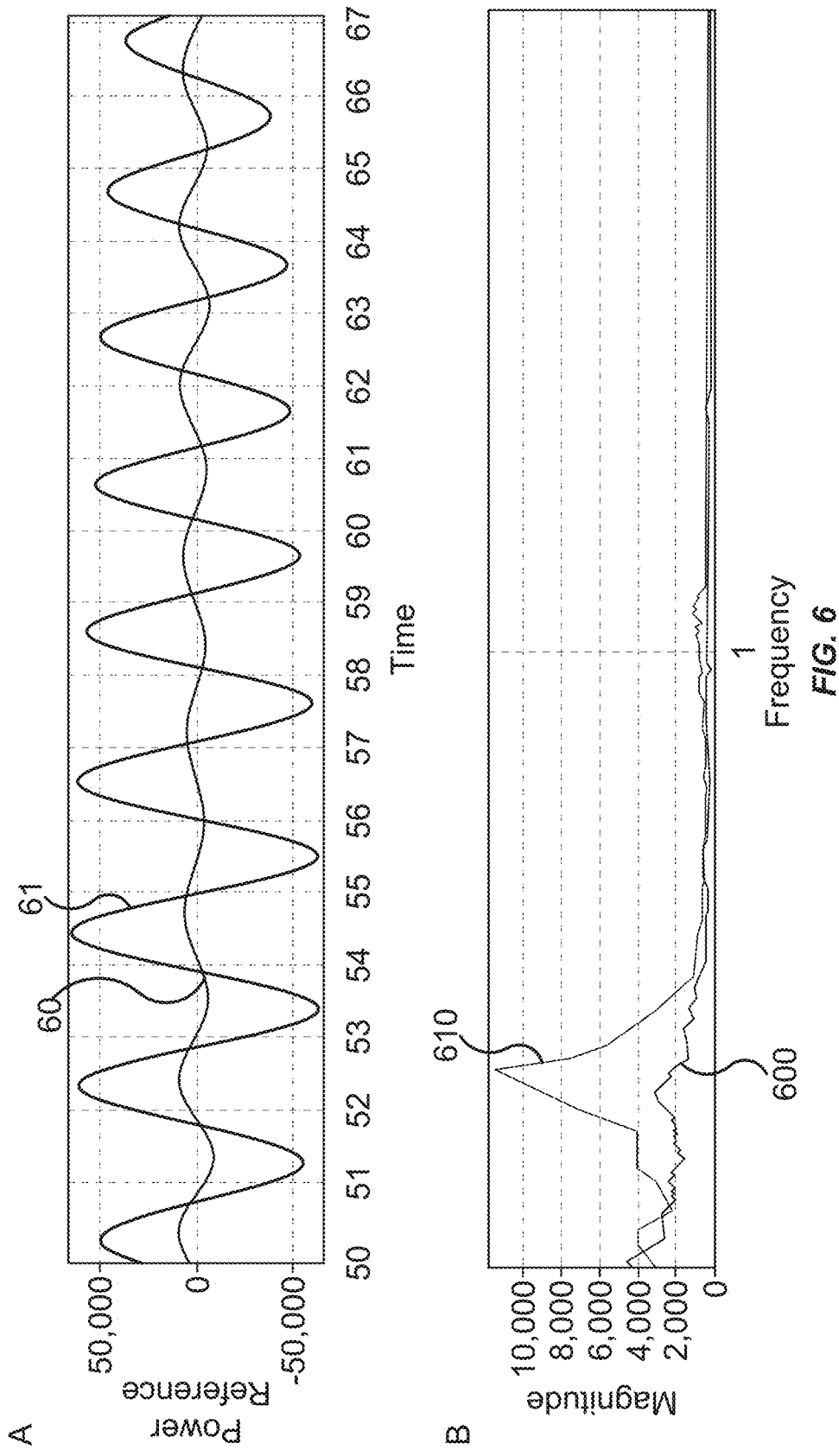

FIGS. 4 to 6 show plots of simulated signals. The simulations are based on a computerized simulation of an operating wind turbine for a wind speed of 8 m/s under the normal turbulence model, A-plots illustrate sensor plots in time domain, whereas B-plots illustrate corresponding plots in the frequency domain obtained by Fourier transform.

FIG. 4 illustrates simulation plots of the generator speed $\omega_G$. FIG. 4A illustrates two simulations, one simulation 40 obtained without application of the signal processing module 300 and one simulation 41 with application of the signal processing module 300.

As can be seen on the figure, the generator speed has a clear oscillation at the 3P frequency. While small variations can be seen between the simulations, application of the signal processing module does not influence the frequency contents of the generator speed signal, and thereby the application of the signal processing module does not excite or destabilise the system.

FIG. 5 illustrates simulation plots of the main bearing driving moment, i.e. the driving moment of the rotor at the main bearing. The simulation plot 50 illustrates the driving moment without application of the signal processing module 300, whereas the simulation plot 51 illustrates the driving moment with application of the signal processing module 300. As can be seen the 3P content of the driving moment has clearly been reduced. This is confirmed in the frequency plots of FIG. 5B, where the frequency content in the 3P region is considerably decreased between the frequency signal for the respective signals obtained with 510 application of the signal processing module 300 and without 500.

Torque variations in the driving moment give rise to fatigue exposure, and be decreasing these variations, also the fatigue exposure is decreased.

FIG. 6 illustrates simulation plots of the resulting power reference, again without 60 and with 61 application of the signal processing module. In relation to FIG. 3, this corresponds to $P_{ref}$ for the situation without application of the signal processing module, and $P^*_{ref}$ with application of the module. The corresponding frequency plots are shown as 600 and 610.

As can be seen disturbances in the torque on the rotor shown on FIG. 5 is at least partly transmitted through the drivetrain and into the electrical system of the generator, as reflected in the oscillating power reference.

The skilled person will appreciate that modifications may be made to the specific embodiments described above without departing from the inventive concept as defined by the claims.

The invention claimed is:

1. A method of controlling a wind turbine, the wind turbine comprising (i) a rotor having one or more blades and (ii) an electrical generator, the rotor being connected to the electrical generator by a drivetrain, the method comprising:
   receiving a signal indicative of a speed of the electrical generator and receiving a signal indicative of a requested output power;
   filtering the signal indicative of the speed to isolate frequencies in a selected disturbance frequency band to generate a disturbance signal;
   phase shifting a phase of the disturbance signal to match a phase of torque variations of the rotor at the frequencies of the selected disturbance frequency band to generate a phase shifted signal;
   generating a modification signal based on a sum of the phase shifted signal and the signal indicative of the requested output power; and
   controlling the wind turbine using the modification signal.

2. The method of claim 1, wherein the modification signal used to control the wind turbine is at least one of a power reference or a torque reference.

3. The method of claim 1, wherein prior to filtering the signal indicative of the speed to isolate frequencies in a selected disturbance frequency band, the signal indicative of the speed is filtered with a drivetrain notch filter, wherein the notch filter removes a resonant frequency of the drivetrain.

4. The method of claim 1, wherein the phase shifted signal is further modified with a signal gain.

5. The method of claim 4 wherein the signal gain comprises a term based on a wind speed.

6. The method of claim 4 wherein the signal gain comprises a term based on a rotor speed of the wind turbine.

7. The method of claim 4, further comprising:
   determining an electrical disturbance at a point of measurement electrically connecting the wind turbine to an electrical grid, wherein the signal gain comprises a term based on the determined electrical disturbance.

8. The method of claim 1, wherein the signal indicative of a speed of the electrical generator is based on an electrical generator speed signal, a rotor speed signal or a combination of the rotor speed signal and the generator speed signal.

9. The method of claim 1, wherein the signal indicative of a speed of the electrical generator is based on a rotational load signal of a rotor axis.

10. The method of claim 1 further comprising:
    predicting a trajectory of the signal indicative of the requested output power, where the trajectory comprises a time series of values indicative of the requested output power, and where the trajectory includes a predicted first control value; and
    setting the signal indicative of the requested output power based on the predicted first control value.

11. A wind turbine control system comprising:
    a signal processing module comprising one or more processors programmed to perform an operation, the operation comprising:
       receiving a signal indicative of a speed of an electrical generator;
       filtering the signal indicative of the speed to isolate frequencies in a selected disturbance frequency band to generate a disturbance signal;
       phase shifting a phase of the disturbance signal to match a phase of torque variations of a rotor at the frequencies of the selected disturbance frequency band to generate a phase shifted signal; and
    the control system further being adapted to:
       receive a signal indicative of a requested output power;
       generate a modification signal based on a sum of the phase shifted signal and the signal indicative of the requested output power; and
       control the wind turbine using the modification signal.

12. A computer program product comprising a non-transitory computer readable medium storing software code which, when executed, performs an operation to control a wind turbine comprising (i) a rotor having one or more blades and (ii) an electrical generator, the rotor being connected to the electrical generator by a drivetrain; the operation comprising:
    receiving a signal indicative of a speed of the electrical generator and receiving a signal indicative of a requested output power;
    filtering the signal indicative of the speed to isolate frequencies in a selected disturbance frequency band to generate a disturbance signal;
    phase shifting a phase of the disturbance signal to match a phase of torque variations of the rotor at the frequencies of the selected disturbance frequency band to generate a phase shifted signal;
    generating a modification signal based a sum of the phase shifted signal and the signal indicative of the requested output power; and
    controlling the wind turbine using the modification signal.

13. The program product of claim 12, wherein the modification signal used to control the wind turbine is at least one of a power reference or a torque reference.

14. The program product of claim 12, wherein prior to filtering the signal indicative of the speed to isolate frequencies in a selected disturbance frequency band, the signal indicative of the speed is filtered with a drivetrain notch filter, wherein the notch filter removes a resonant frequency of the drivetrain.

* * * * *